No. 710,091. Patented Sept. 30, 1902.
C. ALLENOU.
APPARATUS FOR DISCHARGING INFLAMMABLE OR OTHER LIQUIDS FROM STORAGE TANKS AT THE OUTBREAK OF FIRE.
(Application filed Apr. 8, 1902.)
(No Model.) 5 Sheets—Sheet 1.
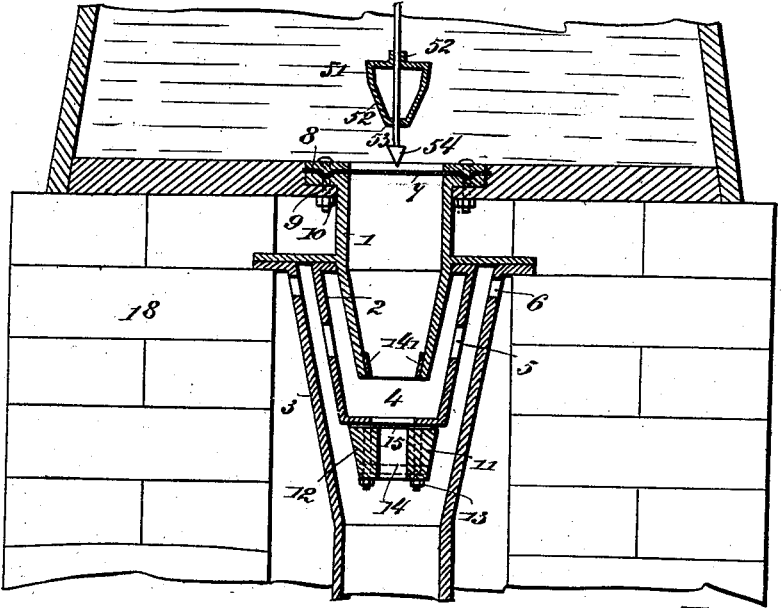
Witnesses:
A. Mitchell
L. J. Jones
Inventor:
Charles Allenou
per B. Singer
Attorney No. 710,091. Patented Sept. 30, 1902.
C. ALLENOU.
APPARATUS FOR DISCHARGING INFLAMMABLE OR OTHER LIQUIDS FROM STORAGE TANKS AT THE OUTBREAK OF FIRE.
(Application filed Apr. 8, 1902.)
(No Model.)
5 Sheets—Sheet 2.
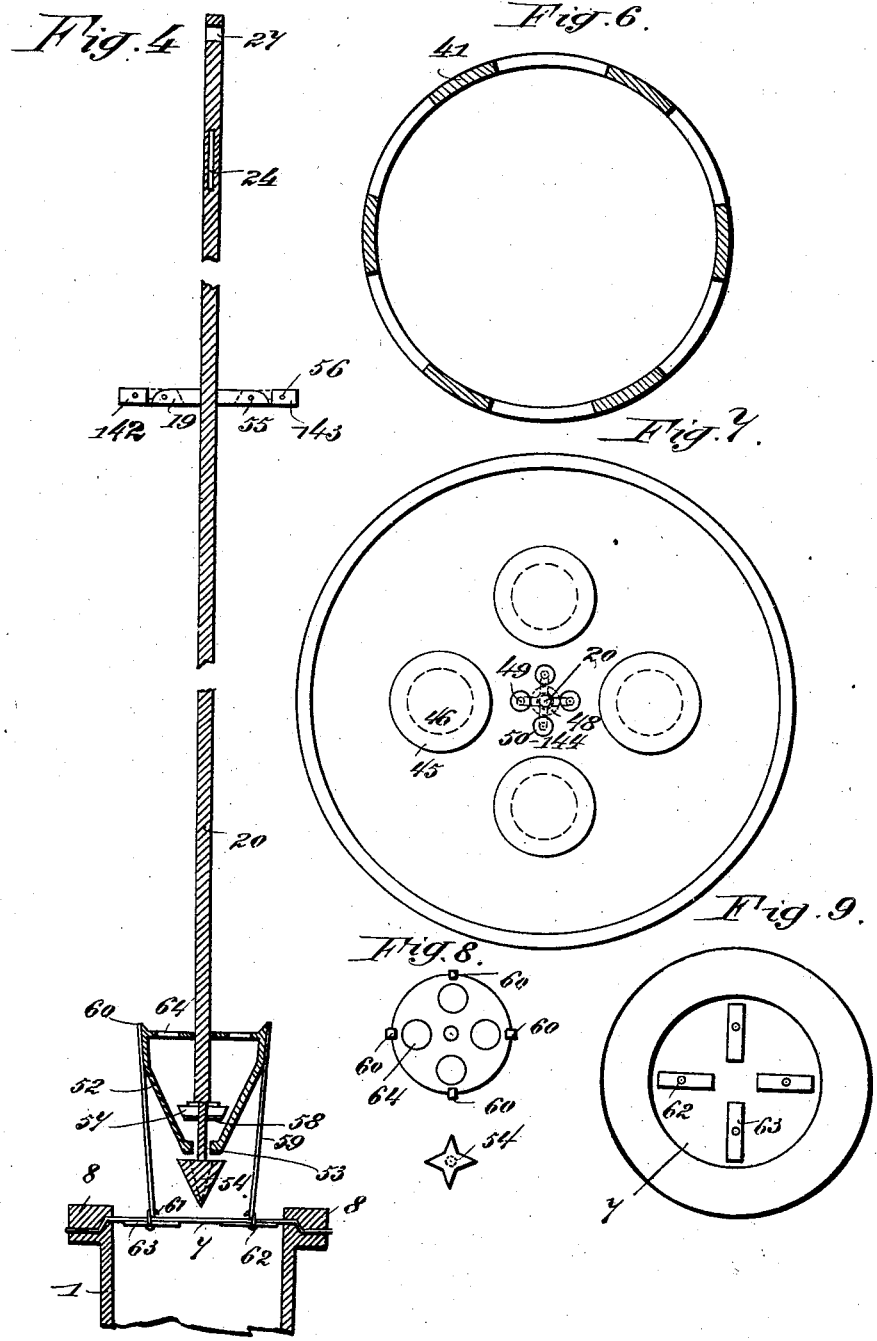

No. 710,091. Patented Sept. 30, 1902.
C. ALLENOU.
APPARATUS FOR DISCHARGING INFLAMMABLE OR OTHER LIQUIDS FROM STORAGE TANKS AT THE OUTBREAK OF FIRE.
(Application filed Apr. 8, 1902.)
(No Model.) 5 Sheets—Sheet 3.
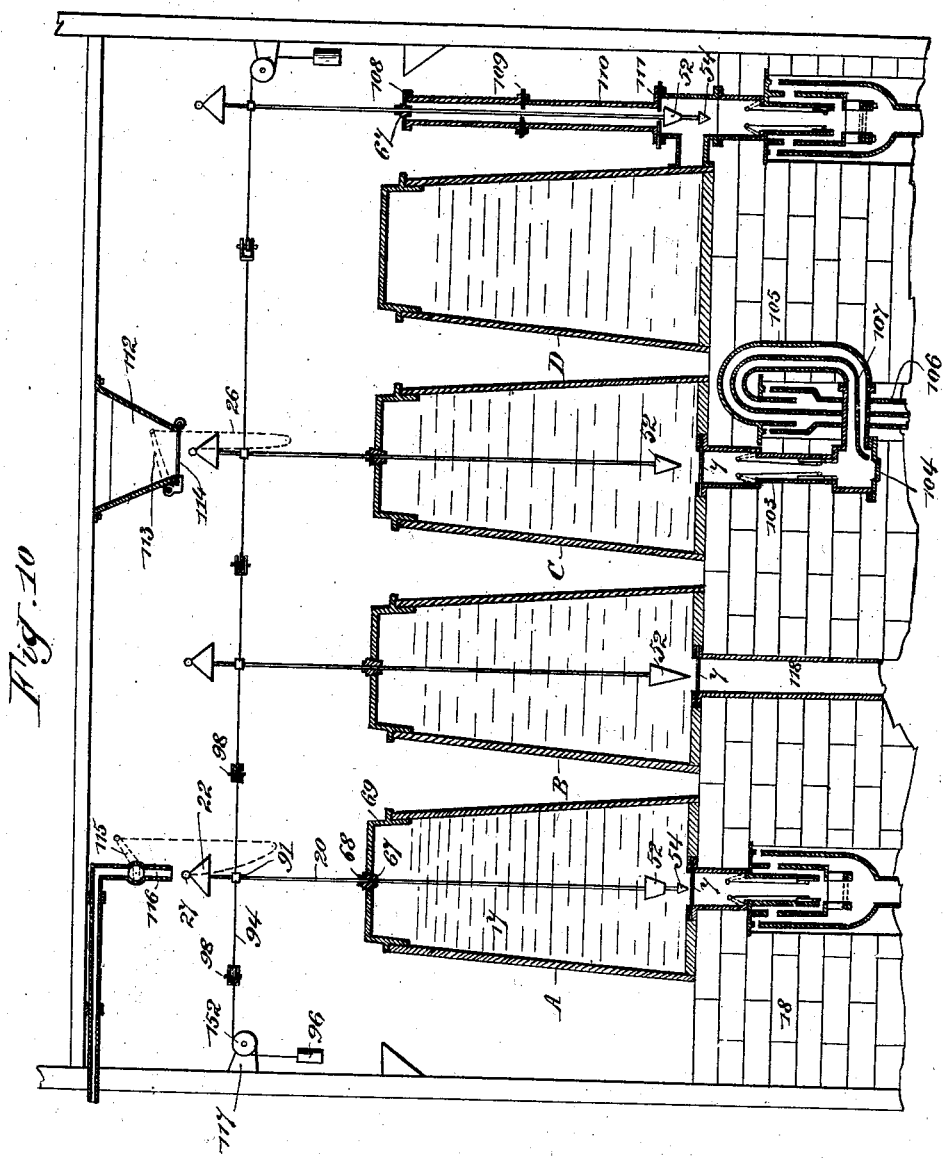

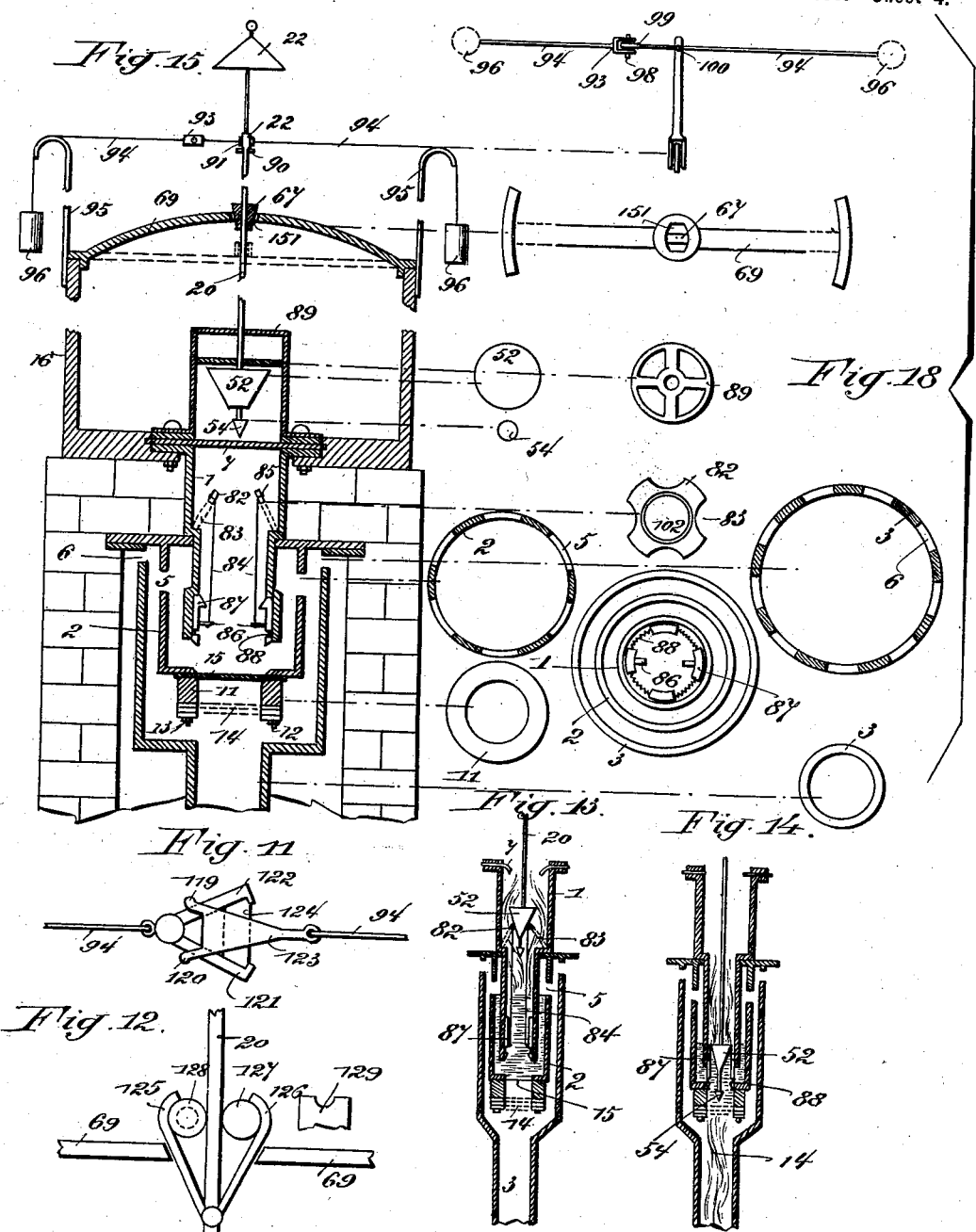

No. 710,091. Patented Sept. 30, 1902.
C. ALLENOU.
APPARATUS FOR DISCHARGING INFLAMMABLE OR OTHER LIQUIDS FROM STORAGE TANKS AT THE OUTBREAK OF FIRE.
(Application filed Apr. 8, 1902.)
(No Model.)
5 Sheets—Sheet 5.
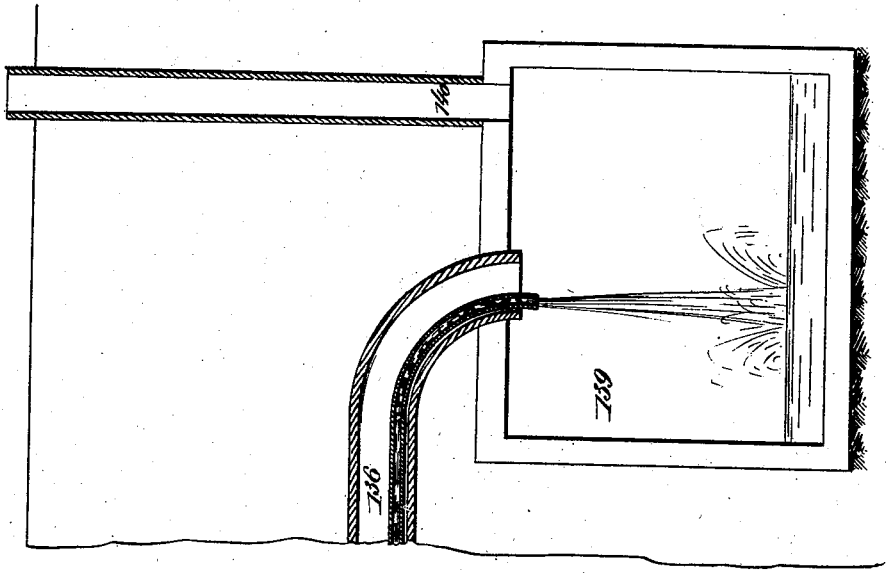
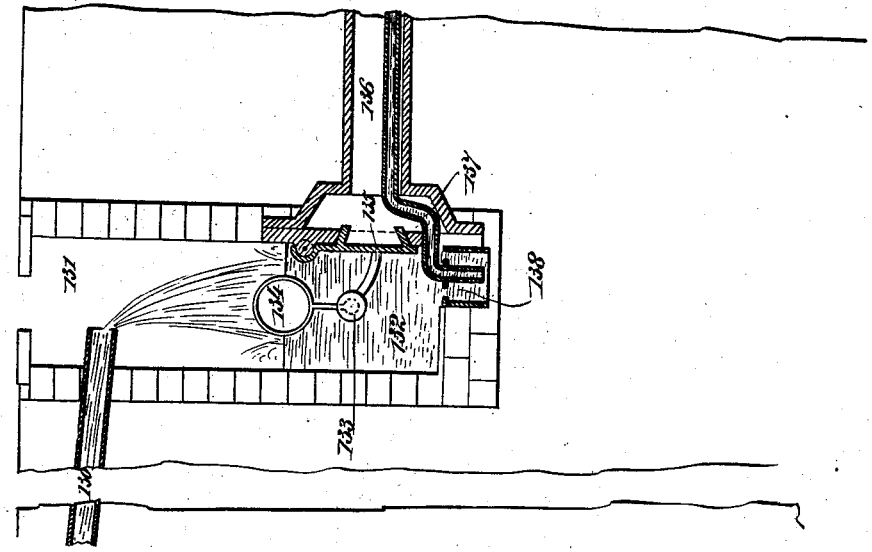
Witnesses:
A. Mitchell
L. J. Jones.
Inventor:
Charles Allenou
per B. Singer
Attorney

UNITED STATES PATENT OFFICE.

CHARLES ALLENOU, OF SEVRES, FRANCE.

APPARATUS FOR DISCHARGING INFLAMMABLE OR OTHER LIQUIDS FROM STORAGE-TANKS AT THE OUTBREAK OF FIRE.

SPECIFICATION forming part of Letters Patent No. 710,091, dated September 30, 1902.

Application filed April 8, 1902. Serial No. 101,929. (No model.)

*To all whom it may concern:*

Be it known that I, CHARLES ALLENOU, a citizen of the French Republic, and a resident of Sevres, France, have invented a certain new and useful Automatically-Operated Apparatus for Discharging Inflammable or other Liquids from Storage-Tanks at the Outbreak of Fire, of which the following is a specification.

My invention has reference to apparatus for discharging inflammable or other liquids from storage-tanks at the outbreak of fire, and has for its objects to save both said liquids and the storage tank or tanks.

The annexed drawings show, by way of example, an arrangement embodying my invention.

Figure 1 is a vertical section of a complete apparatus designed to be utilized in conjunction with a vessel or tank containing inflammable liquid, said apparatus being placed upon the top of the latter. Fig. 2 is a detail. Fig. 3 is an adaptation of Fig. 1 applied to a tank containing inflammable liquid. Figs. 4 to 9 are details of the arrangement shown in Fig. 3. Fig. 10 represents several applications of the apparatus connected together in series by joined wire or other suitable means. Figs. 11 and 12 show the arrangement of the fusible starting device. Figs. 13 and 14 are views indicating the working of the apparatus when the liquid is ignited. Fig. 15 is a vertical section of a further application of the apparatus indicated in Fig. 3. Figs. 16 and 17 represent a section of a safety-tank and a cistern arranged to receive the liquid which is drained from the storage-tanks. Fig. 18 represents some details of Fig. 15.

The principal features of my siphon apparatus are as follows: The arrangement comprises a siphon, Fig. 3, formed of three pipes 1 2 3, made of metal or other suitable material, of either cylindrical or conical form and which are seated one in the other, with communicating openings between them, as indicated at 4 5 6. This siphon is placed underneath the tank 16 and is supported by a frame 18. The pipe 1 is fixed to the tank 16 and is closed at its upper end by a thin plate 7, constructed of metal or other suitable material, which closes all communication between said pipes and the tank. The plate 7 is held in place by a ribbed flange 8 and fastened tightly by bolts and nuts 9 10. A leather washer 141, prepared in such a manner as to remain flexible, is fixed inside the lower end of the pipe 1. The pipe 2 is attached by bolts to the pipe 1, communication being established between the pipes 1 and 3 by the openings 4 and 5. The pipe is closed further by a thin plate 15, of metal or other suitable material, held in place by a round block of metal 11, to which is also fastened some metallic gauze 14, held in place by a small washer and secured by studs and nuts 12 and 13, and finally the pipe 3 conducts away the liquid from the tank 16. The openings 6 are provided with metallic-gauze coverings and are for the purpose of admitting air while the liquid is escaping. Over the plate 7 is placed a rigid rod 20, of metal or any other suitable material, carried by a small metal cotter-pin 21, fixed into an opening 24, the whole being supported by a metal weight 22. Said rod has two reversed cones 52 54 attached to it. The cone 52 is hollow and closed at its upper end. On the lateral portion openings 51 and 53 communicate with the interior of the cone 52, while cone 54 is solid and pointed. The upper portion of the rod 20 is provided with a metal portion 19, on which two articulated branches 142 143 are held firmly by a small spring 55, which is carried by a pin 56, Fig. 4. An opening 27 at the end of the rod 20 is provided to enable a small chain 26 to be connected thereto, the other end of said chain being fastened to the lever-arm 115 (said chain being conventionally illustrated in Fig. 10) of a water-supply valve 116, which is placed over the tank 16. The tank is closed by means of a cover formed of two platforms 38 43 of different circumferences, the smallest being at the top, separated one from the other by supports 41, held in place by bolts 40 and hooped around with one or more bands of metallic gauze 42. The platform 43 is substantially horizontal, but has a slight inclination toward the center. Said platform is formed with several rimmed apertures 44, which are closed by weighted hinged flap-valves 45 46, the counterweight being indicated in 47. Some further openings 50 are hermetically closed by thin metal sheets 144, supporting small cones 49, fastened to small rods in the form of a tripod 48 and disposed around the rod 20. The platform 38 has an aperture 39 formed in the center to permit the rod 20 and the flap-plate 19 to fall freely. It also supports a metal cylinder 32, terminated by two standards 28, surmounted by a roof 25. The said cylinder is made in two portions in its thickness of which one is projecting 35 and the other retiring. The projecting portion is formed by the conjunction of two helical segments of one-fourth of a turn, having the same original form and being placed diametrically opposite. Two vertical slots 29, diametrically opposite, placed at the junction of each of these segments, serve as guides to the two projections 145 of a metallic disk 30. Said disk is formed with a suitable hole in the center 31 and is held in place by a spring 34, resting on the cover 38. The standards 28 have each a groove 29, acting as guides for the projections 146 on the weights 22. Said weight has a suitable hole 147, formed vertically through its center and supports the rod 20 and is itself held in place by two cylinders 23, wholly or partly composed of a material which is fusible at a high temperature, but will resist ordinary temperatures—such as Darcet alloy, hard beeswax, &c.—held in place laterally by a semicylindrical hollow formed in the standards 28.

Fig. 4 is a vertical section of the rod 20 and indicates specially the provision made for the suspension of the cone 52 and the relief of the plate 7. Said cone 52 is hollow and mobile and is provided with openings 53 64. In the interior of this cone and fixed to the rod 20 is a small metal plate 58, supporting a round washer of thick leather or cork 57. In order to reduce the effect of the pressure of the liquids which is imparted to the plate 7, metal rods 59, terminating in hooks 60 and 61 at each end, are placed with the one end on the edge of the cone 52 and attached at the other end to the pins 62. These pins first pass through the plate 7, to which they are brazed and for further rigidity are supported by plates 63, which are independent of plate 7. When the weight 22 and the rod 20 descend, a small chain operates on the arm of a lever attached to a water-cock arranged over the tank. By this means the water floods the outside of the tank and platform 43, where it spreads in such a manner as to flow over the metallic gauze, without at the same time being able to penetrate to the interior of the tank itself. Said water can only penetrate into the interior of the tank when the rod 20 nears the end of its travel, when the flap 19, acting upon the tripod, penetrates the small plates 144 by means of the small cones 49. Water is admitted by the aforementioned operation into the tank, and at the same time and by the completion of the movement the bottom of the tank is hermetically sealed by the cone 52, causing a gradual dispersion by the valves 46 of the mixture of vapor and explosive air which may be found in the tank and entirely filling same.

In further explanation of the working of my apparatus, in the event of a fire taking place in the vicinity of the tank or the temperature of the air reaching the fusing-point of the fusible rolls 23 the weight 22 being released falls on the flap 19 and gives impetus to the fall of the rod 20. The weight 22 is stopped by the projections of the cylinder 32. In the descent of the rod the cones 52 54 pass through the plate 7 and are then kept in position by the weight of the column of liquid 17, by which they are supported. By the latter movement the flap 19, resting on the disk 30, compresses the spring 34 until the projection 145 of this disk comes into contact with the projection 33. The liquid in the tank then flows out by the pipes 1 2 3. When the tank is empty, the tension of the spring being only actuated by the weight of liquid in the cone 52, the said spring tends gradually to regain its original position in proportion to the flow of liquid through the small openings 51 53. In this ascending movement the mobile arms 142 143 of the flap 19, which were lightly held folded back in passing between the projecting parts 35 of the cylinder 32, afterward distend, imparting, in conjunction with the helical segments 35, with which they engage, a rotary movement through about ninety degrees to the rod 20, during which movement the fixed portions of the flap 19 and the wedge 21 pass through a slot in the opening 31 of the disk 30, and the weight 22 and the rod and cones again fall. In this latter descending movement the cone 54 pierces the small thin plate 15, and thus allows the liquid which has gathered in the pipe 3 to flow over the metallic gauze 14. At the same time the cone 52 engages with the leather washer 141, closing hermetically all communication between the tank and the tube 3. The water spreading over the platform 43 then penetrates into the tank by the openings made in the small plates 144 by the descent of the small cones 43, as has been explained hereinbefore.

My apparatus may be subjected to various modifications, as described hereunder.

An arrangement as shown in Figs. 1 and 2 can be attached to the platform 38 and be substituted for that hereinbefore described for the purpose of carrying the rod. This arrangement is formed of two metallic standards 28, terminated by a roof 69. The said roof has a central aperture carrying a small cone of fusible metal or any other analogous material 67. Said cone is penetrated by the rod 20, of which the plate 66 supports the weight 22. Said rod is held in suspension by a nut 68. A hollow cylinder 81, fixed to the lower part of the two standards 28, is cut out at one part of its thickness with openings 79 148 149, of the form shown in Fig. 2, symmetrically and diametrically opposed. A metal cylinder 76, which is arranged to move easily around the cylinder 81, is formed with vertically-disposed slots 77, diametrically opposite. Two pins 78, fixed by the side of the openings 77, are for the attachment of wire ropes 73, conventionally illustrated in Fig. 1 of the drawings, arranged with that from the right-hand to the left-hand pin and that from the left to the right hand pin guided by the pulleys 70 75, fixed to the supports 71 150, and passing freely through vertical openings constructed in the thickness of the weight 22 terminate by metal plates 74. Inside the cylinder 81 is arranged a movable disk 30, supported by a spring 34 and in which the projections 145 engage in the openings 77 79. The rod 20 is arranged in such a manner as to be unable to turn during the falling movement.

The movements of the various parts are indicated hereunder. The cone 67 fusing, the weight 22 and the rod 20 fall. The plates 74 stop the weight 22, and by this means pressure is exerted on the wire rope 73, tending to impart a rotating movement to the cylinder 76. The plate 66 and the rod 20 rest on the movable disk 30, and compressing the spring 34 the pins 145 of the disk 30 slide along the vertical slot 77 of the cylinder 76 and the right-hand stop 79 until they pass the ledge of the cylinder between 79 and 145. The pins then slide along to the right-hand stop 149 as far as the juncture at the base of the opening 148. When the tank and the cone 52 are emptied of liquid, the rod ascends under the action of the spring 34 and the pins slide along the right-hand stop of the opening 148 until, as there is nothing to oppose them, they enter into the hollow space 148. During the rotation of the disk 30 the plate 66 is carried through the opening 31 of the disk, and the cone 52 falls onto the washer 141 of the pipe 1.

Further arrangements of the apparatus hereinbefore described can be made, according to the proportion of dangerous properties possessed by the liquids contained in the tanks.

Fig. 15 is a siphon over which are supported two plain cones 52 54, fixed to a rod 20. The said rod is guided by the supports 89, and is held in position by a wedge of the section of the trunk of a cone 67, which is formed of a metal or other substance which is fusible at a low temperature. The body of the said cone rests in the opening 151 of a metal arch 69, which is placed over the cover 97 of the tank 16. The rod 20 is furnished at its upper end with a heavy conical weight 22, to which is attached a metal chain 26, fastened at its other extremity to the lever-arm 115 of a cock connected with a water-pipe 116, Fig. 10, or by the same means to a catch 113, acting on the shutter 114 of a box containing sand. A projecting portion of the rod 20 is engaged by a fork 91, hanging from a guide 101, which is held in position by a metal rope 94, kept tight by the weight 96. The junctions of the forks 93 are connected together by fusible pins 98, binding between them the different parts of the rope 94. If the liquid in the tank 16 takes fire, the cone 67 fuses and the rod 20 and the cones 52 54 penetrate the plate 7, the cone 52 in falling, stops on a species of cone 82 formed of pewter (or any other easily-fusible metal or material) suitably constructed 83 102. When the tank is empty, the equilibrium of the liquid is reduced to the same level in the branches of the tubes 1 2, Figs. 13, 14. The burning liquid in the tube 1 at once melts the perpendicular cords 84 or the pewter or other substance fixed in 85 and 86, which supports a small metallic cylinder 87, formed with several openings 88 and covered with metallic gauze. This cylinder in falling rests upon the top of pipe 2, closing all direct means of connection between pipes 1 and 2. Under the action of the flames from the liquid in the tube 1 the portions 82 are fused and the cones 52 54 fall. The cone 52 is stopped by the upper part of the cylinder 87, while the cone 54 penetrates the small plate 15, allowing the excess of liquid to flow over the metallic gauze 14. If, as may happen otherwise, the fire does not take hold of the liquid in the tank, but the surrounding air reaches the point of fusion of the plugs 98, these in melting destroy the balance of the counterweights 96, and the guide 101, fixed to the rope 94 by the pin 100, would carry the rod 20 through a rotary movement of 90 degrees. The section of a cone 67 being then moved to the largest opening in the hollow part 151, the rod then falls uniformly, and the cones 52 54 penetrate the plate 7.

Figs. 13 and 14 show clearly the application of the apparatus when the liquid is burning.

Figs. 11 and 12 show some alternative application by which it is possible to substitute for the metal cones more fusible and less resisting substances, said substances 124 127 128 (hard beeswax or others) held between scarfed metal plates 121 122 and 125 126 by hinges in a form as indicated in 129. Under the fusion of said substances these metal plates draw together and no longer offer resistance to the pins 119 120 of the fork 123 or to the edges of the sliding receptacle 151 of the support 69. Fig. 10 represents various applications of my invention connected in series by means of the cord 94 and joints 93, held in tension by the weights 96, which pass over the pulleys 152, carried by the supports 117, the tank being furnished in this application with a water-supply pipe situated above it.

The following is an explanation of the working: The tank B, containing an inflammable or almost-inflammable liquid, as beer, wine, and the like, is arranged with an apparatus in which the siphon is replaced by a simple tube 118, closed by a plate 7. The tank C is arranged with an apparatus in which the siphon is included. When the tank is empty and equilibrium takes place in the branches 104 105, the excess of liquid escapes by a small siphon 107, covered with metal gauze, and attracts at once the flow of liquid to the pipe 106. Lastly, the tank D is provided with my apparatus placed at the exterior of the tank and surmounted by a long metal tube 110. The plates 109 111 act as guides to the rod 20 and the plates 108 as a support for the cone 67. On leaving the tanks the liquid discharges into cisterns outside the building, passing, where necessary, through a cesspool in order to lessen the chance of the fire being communicated to the liquids when very inflammable. The liquid reaches the cesspool 131 by the pipe 130 and fills up the bottom part. A small siphon 137, covered with metallic gauze 138, forthwith allows a partial flow of liquid into the cistern 139. The liquid 132, gradually filling the cesspool 131, raises the float 134, connected to the counterweight 133 of a flap-valve 135, covered with metallic gauze. When the liquid reaches the highest level of the conduit 131, a siphon-action is created, and a portion of the liquid flows into the cistern 139 until the float 134 in descending closes the valve 135. In combination with and in case of any accidental communication of fire to the liquid contained in the cesspool the safety apparatus can nevertheless operate and the liquid be discharged into the cistern 139, which communicates with the open air by means of the pipe 140.

Having now fully described my invention, what I claim, and desire to secure by Letters Patent, is—

1. The combination with a tank for the storage of inflammable liquid, and a discharge-pipe leading from the bottom thereof, of a diaphragm arranged across and normally closing said discharge-pipe, a puncture device supported above said diaphragm by a fusible joint, and means connected with said puncture device for automatically closing the discharge-pipe after the liquid has been discharged from the tank.

2. The combination with a tank for the storage of inflammable liquid, and a discharge-pipe leading from the bottom thereof, of a frangible disk or plate arranged across and normally closing the discharge-pipe, a rod supported by a fusible joint and adapted when released to break said disk or plate and establish communication between the tank and discharge-pipe, and means connected with said rod for closing the discharge-pipe after the liquid has been discharged from the tank.

3. The combination with a tank for the storage of inflammable liquid, and a discharge-pipe leading from the bottom thereof, of a frangible disk or plate arranged across the inner end of the discharge-pipe, a rod supported above said disk or plate by a fusible joint and adapted when released to break said disk or plate, a stop or plug mounted on said rod and adapted to close the discharge-pipe, and means controlling the movement of said rod, whereby when released it will first break the frangible disk or plate and after the liquid from the tank has been discharged will be again operated to bring the plug thereon into position to close the discharge-pipe.

4. The combination of a tank for the storage of inflammable liquid having an aperture in its top, a discharge-pipe leading from the bottom of the tank, frangible disks or plates normally closing said discharge-pipe and the aperture in the top of the tank, means for breaking said disks or plates normally held in active positions by suitable fusible material, a water-supply duct, and a valve in said duct connected with and adapted to be opened by said breaking means, said parts being so arranged that when the breaking means is released, the water-valve will be opened and the disks or plates closing the discharge-pipe and the aperture in the top of the tank successively broken.

5. The combination of a tank for the storage of inflammable liquid having an aperture in its top, a discharge-pipe leading from the bottom of the tank, frangible disks or plates normally closing the discharge-pipe and said aperture in the top of the tank, a rod supported by the fusible joint above the disk closing the discharge-pipe, means connected with said rod for breaking the disk closing the aperture in the top of the tank, a water-supply duct having a valve connected with said rod, and means connected to said rod for closing the discharge-pipe, said parts being so arranged that when the rod is released the disk closing the discharge-pipe will be broken and the valve in the water-supply duct opened and thereafter the discharge-pipe will be closed and the disk closing the aperture in the tank-top broken to admit water to the interior of the tank.

6. The combination with a tank for the storage of inflammable liquid, a discharge-pipe leading therefrom, and a water-pipe arranged above the tank, of means for normally closing said pipes, automatic means for opening said pipes, a fusible joint normally holding said means in inactive position, and supplemental means for closing the discharge-pipe and admitting water to the interior of the tank.

7. The combination of a tank for the storage of inflammable liquid, having a plurality of apertures in its top, frangible disks closing one or more of said apertures, outwardly-swinging valves closing the other of said apertures, a discharge-pipe leading from the bottom of the tank, a water-pipe adapted to deliver water onto the tank, and means, normally held in inactive position by a fusible joint, for actuating a valve in the water-pipe and successively opening the discharge-pipe and breaking the frangible disk or disks at the top of the tank.

8. The combination of a tank for the storage of inflammable liquid, a discharge-pipe leading from the bottom of the tank and consisting of three concentrically-arranged members the inner member being completely open at its lower end, and communicating at its upper end with the tank, the intermediate member having outlets in its bottom and side walls, and the outer member having air-inlets in its side walls above the plane of the outlets in the intermediate member, frangible disks or plates arranged across the upper end of the inner member and the lower end of the intermediate member of said pipe, a rod supported by a fusible joint above the disk or plate at the upper end of the inner member of the discharge-pipe, a plug or stopper mounted on said rod above its lower end, and adapted to fit snugly within the lower end of the inner member of the discharge-pipe when said rod is in its lowest position, means for forcing the rod downwardly when released, to cause its lower end to successively break or pierce the disks or plates across the discharge-pipe, and means for preventing the rod from assuming its lowest position until the liquid in the tank has been discharged.

In testimony whereof I have hereunto set my hand in presence of two witnesses.

CHARLES ALLENOU.

Witnesses:
JOSEPH HAGUES,
HENRY MORLEY.